United States Patent [19]

Swanson et al.

[11] 4,014,412
[45] Mar. 29, 1977

[54] ELECTRICALLY CONTROLLED BRAKE WITH IMPROVED ANTI-ROTATION BRACKET FOR MAGNET

[75] Inventors: David L. Swanson, Rockford, Ill.; Robert C. Walter, South Bend, Ind.

[73] Assignee: Warner Electric Brake & Clutch Company, South Beloit, Ill.

[22] Filed: Feb. 17, 1976

[21] Appl. No.: 658,376

[52] U.S. Cl. .............................. 188/138; 188/161
[51] Int. Cl.² .............................................. B60T 7/12
[58] Field of Search .......... 188/137, 138, 164, 163, 188/161, 205 R, 331, 332; 192/84 A, 84 PM; 335/281, 282, 220, 296, 297, 299.

[56] References Cited
UNITED STATES PATENTS

| | | | |
|---|---|---|---|
| 2,273,065 | 2/1942 | Penrose | 188/138 |
| 3,756,355 | 9/1973 | Kreider | 188/138 |
| 3,757,264 | 9/1973 | Grove | 188/138 X |
| 3,760,909 | 9/1973 | Grove | 188/138 |

Primary Examiner—Trygve M. Blix
Assistant Examiner—Douglas C. Butler
Attorney, Agent, or Firm—Leydig, Voit, Osann, Mayer & Holt, Ltd.

[57] ABSTRACT

The electromagnet of an electrically controlled brake is prevented from rotating on its mounting pin by a bracket which also captivates the magnet against axial removal from the pin while leaving the magnet free to pivot and float axially on the pin. The bracket is made of a strip of resiliently yieldable material and includes a leg paralleling the pin and secured at one end of the magnet. The other end portion of the leg extends through a hole in the brake operating arm and is integral with a tang which engages the arm to captivate the magnet against axial removal from the pin.

8 Claims, 7 Drawing Figures

4,014,412

ELECTRICALLY CONTROLLED BRAKE WITH IMPROVED ANTI-ROTATION BRACKET FOR MAGNET

BACKGROUND OF THE INVENTION

This invention relates to an electrically controlled brake for a vehicle wheel and, more particularly, to a brake of the type in which an electromagnet is mounted on a pin which projects from one side of a brake operating arm. When energized, the electromagnet frictionally engages an armature which rotates with and usually forms part of the drum of the vehicle wheel structure. Such frictional engagement causes the operating arm to pivot and force one or more brake shoes into engagement with the drum to reduce the speed of the wheel.

The electromagnet is capable of floating axially on the mounting pin and usually is urged into light rubbing contact with the armature by a spring which is telescoped over the pin. To prevent the magnet from rotating on the pin, it is customary to secure the magnet to the operating arm with an anti-rotation bracket. One such bracket is disclosed in Penrose U.S. Pat. No. 2,273,065 and is capable of preventing the magnet from rotating on the pin while still allowing the magnet to shift axially into full face-to-face engagement with the armature.

SUMMARY OF THE INVENTION

The general aim of the present invention is to provide in a brake of the above general type a comparatively simple and inexpensive bracket which not only prevents rotation and allows axial floating of the magnet but which also retains the magnet and the spring in assembled relation on the mounting pin during final manufacture and shipment of the brake and until such time as the brake is assembled with the drum of the wheel structure and the magnet is captivated by the armature.

A more detailed object is to provide an anti-rotation bracket made of resiliently yieldable material and having a unique shape to enable easy installation of the magnet on the mounting pin while thereafter restricting axial removal of the magnet from the pin.

The invention also resides in the novel manner by which the anti-rotation bracket is attached to the magnet to enable quick and easy assembly of the bracket and the magnet.

These and other objects and advantages of the invention will become more apparent from the following detailed description when taken in conjunction with the accompanying drawings.

DETAILED DESCRIPTION OF THE PREFERRED EMBODIMENT

Figure 1:
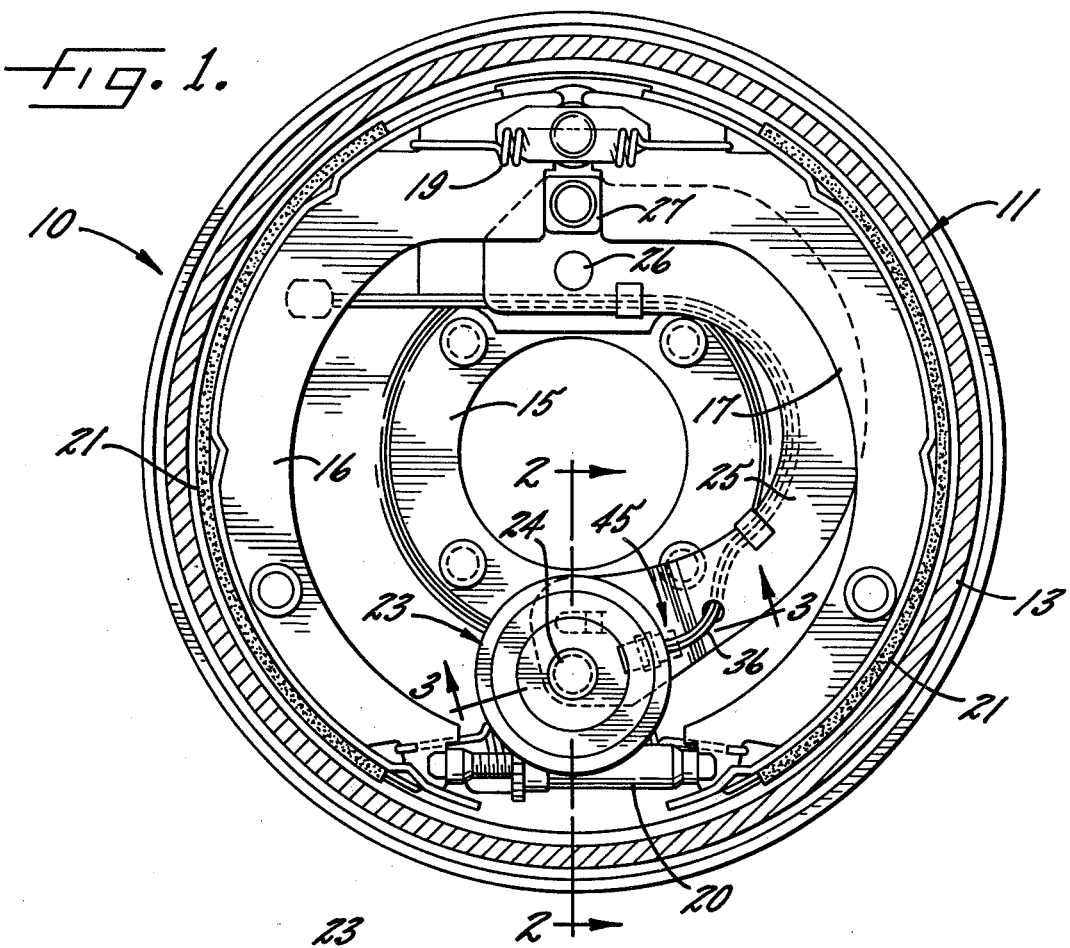
FIG. 1 is a cross-section taken radially through a vehicle wheel structure incorporating the new and improved brake of the present invention.

As shown in the drawings for purposes of illustration, the invention is embodied in an electrically controlled brake 10 for selectively slowing or stopping a member such as a vehicle wheel having a rotatable drum 11 comprising a cast iron flange 13 and an integral plate 14. Stationarily mounted on the vehicle is a backing plate 15 which supports the operating elements of the brake.

Herein, the brake 10 includes a pair of brake shoes 16 and 17 pivotally mounted on the backing plate 15 and urged to released positions by a spring 19, there being an adjustment screw 20 interconnecting the shoes. Friction material 21 is bonded to the shoes and engages the flange 13 of the drum 11 when the brake is applied. To effect such application, an electromagnet 23 is mounted on a pin 24 projecting from the outer side of a support in the form of an operating arm 25. The latter is pivotally mounted on a pin 26 (FIG. 1) on the backing plate 15 and includes an extension which carries a swivel block 27 disposed between the ends of the shoes 16 and 17.

When energized, the magnet 23 frictionally engages the plate 14 of the drum 11, which plate thus forms an armature for the magnet. If the drum 11 is rotating counterclockwise (FIG. 1) when the magnet 23 is energized, frictional engagement between the armature 14 and the magnet will move the latter to the right and cause the operating arm 25 to pivot counterclockwise on the pin 26 and push the swivel block 27 against the end of the brake shoe 16. The latter thus is forced outwardly into braking engagement with the flange 13 of the drum and acts through the adjustment screw 20 to force the shoe 17 outwardly. When the drum is rotating in a clockwise direction, energization of the magnet causes the armature to shift the magnet to the left so that the swivel block 27 pushes against the end of the brake shoe 17 and directly forces that shoe outwardly into engagement with the drum while the screw 20 forces the other shoe 16 outwardly.

Figure 2:
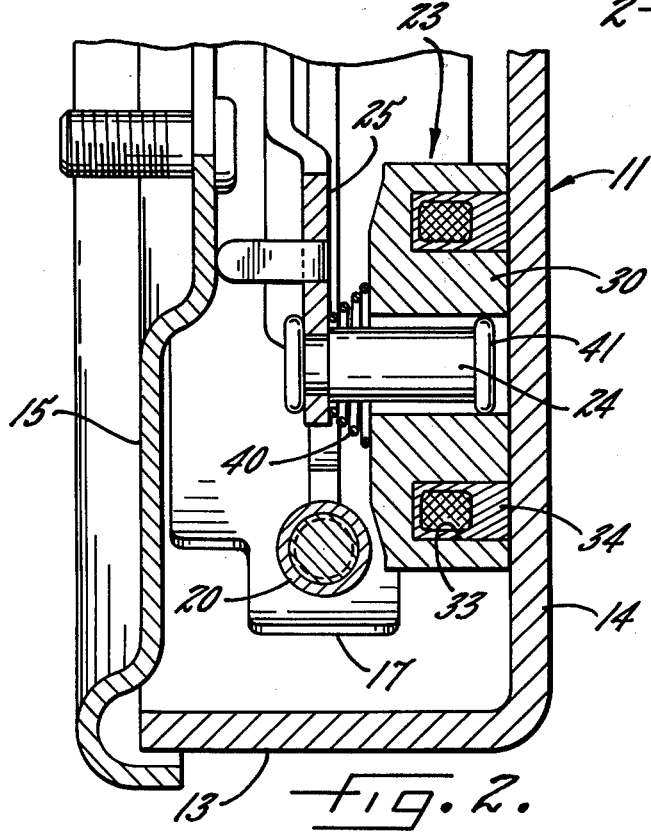
FIGS. 2 and 3 are enlarged fragmentary cross-sections taken substantially along the lines 2—2 and 3—3, respectively, of FIG. 1.

The electromagnet 23 comprises a generally cylindrical shell 30 (FIGS. 2 and 4) made of iron or the like and formed with a central hole 31 for receiving the mounting pin 24. An annular groove 33 is formed in the shell and opens out of the outer axially facing side thereof so as to telescopically receive an annular coil assembly 34. The latter is bonded within the groove by a suitable adhesive and includes a radially projecting tongue 35 which receives electrical leads 36 for conducting current to the coil. The tongue is fitted within a slot 37 (FIG. 4) which extends radially through the periphery of the shell into communication with the groove 33 and which opens out of both the inner and outer axial faces of the shell.

To establish good contact between the armature 14 and the magnet 23, the latter is supported to float axially on the mounting pin 24 and is urged into light rubbing engagement with the armature by a coil spring 40 (FIG. 2) which is telescoped over the pin and is compressed between the outer side of the operating arm 25 and the inner face of the shell 30. Also, the magnet is capable of limited pivotal floating on the pin 24 by virtue of the outer end of the pin being formed with an enlarged head 41 about which the magnet may rock. While it is desirable for the magnet to be capable of floating on the pin, rotation of the magnet about the axis of the pin should be restricted. For this purpose, provision is made of an anti-rotation bracket 45 (FIGS. 3 and 4) whose outer end portion is secured to the magnet and whose inner end portion projects through a hole 46 in the operating arm 25. The inner end portion of the bracket engages the edges of the hole to keep the magnet from rotating on the pin.

In accordance with the present invention, the anti-rotation bracket 45 is uniquely constructed to allow the magnet 23 to be easily telescoped over and installed on the mounting pin 24 but to thereafter restrict axial removal of the magnet from the pin. As a result, the magnet and the spring 40 may be installed on the pin during an intermediate stage of manufacture of the brake 10 and will remain captivated on the pin during subsequent manufacturing stages and until such time as the brake is assembled with the drum 11 and the magnet is retained by the armature 14. Also, if the drum is subsequently pulled, the bracket 45 will prevent the spring 40 from pushing the magnet off of the pin.

More specifically, the anti-rotation bracket 45 is made from a strip of resiliently yieldable material such as spring steel and includes a leg 47 (FIGS. 3 and 4) which extends generally parallel to the pin 24. The outer end portion of the leg is secured to the magnet 23 while the inner end portion of the leg projects through the hole 46 in the operating arm 25 and is formed with an integral tang 49, the latter extending substantially perpendicular to the leg.

Figure 5A:
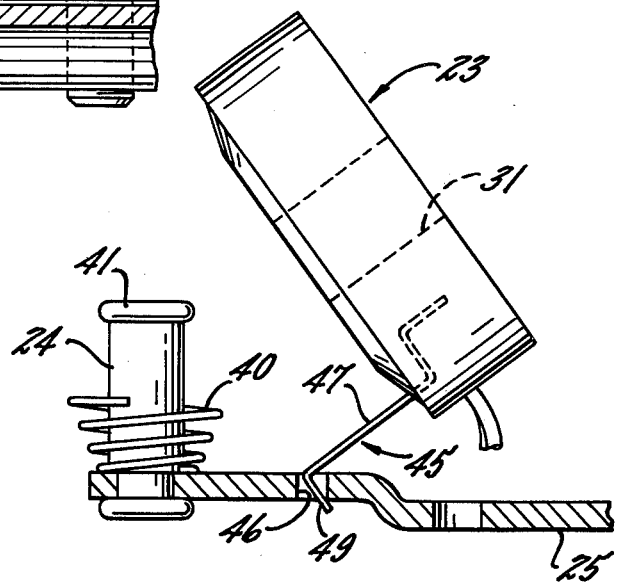
FIGS. 5a and 5b are views which sequentially show the steps of installing the magnet on the mounting pin.
Figure 5B:
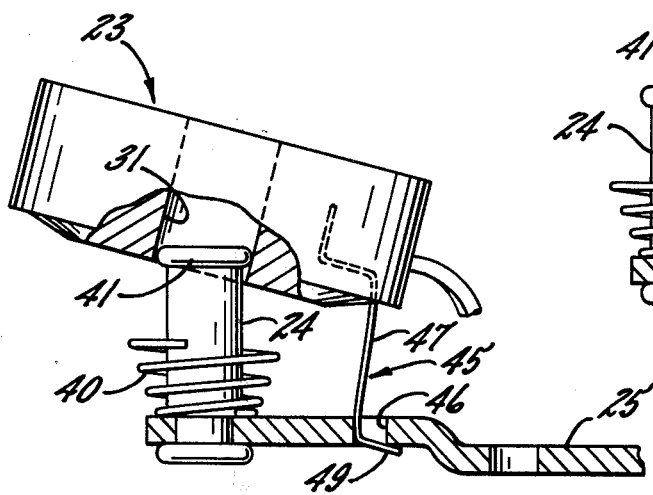

To install the magnet 23 on the pin 24, the magnet first is tilted to the position shown in FIG. 5a to enable insertion of the tang 49 through the hole 46 in the operating arm 25. Thereafter, the magnet is swung downwardly toward the pin. The length of the leg 47, the radial location of the leg on the magnet and the radial spacing of the hole 46 from the pin 24 are all such that the hole 31 in the magnet cannot be brought into telescoping relation with the pin simply by swinging the magnet downwardly toward the pin. But, by applying a force to the magnet and flexing the bracket 45 as shown in FIG. 5b, the bracket—and particularly the leg 47—will yield and allow the hole 31 in the magnet to be slipped over the head 41 of the pin 24. The magnet then may be moved downwardly onto the pin with the leg 47 sliding downwardly within the hole 46 to permit such movement.

Figure 5C:
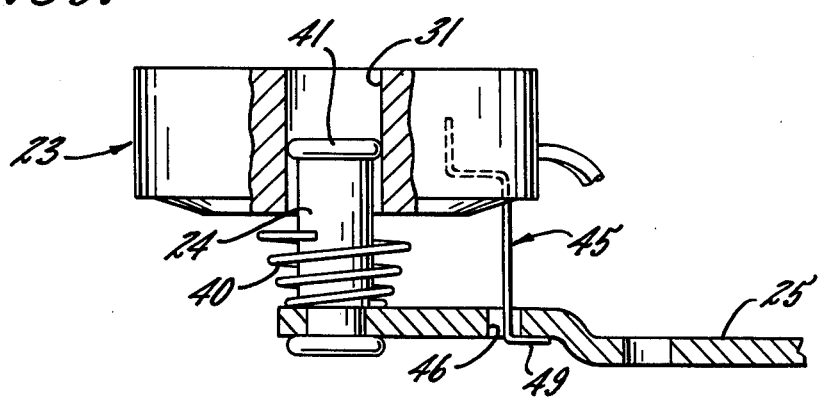
FIG. 5c is a view showing the manner by which the bracket captivates the magnet axially on the pin.

Once the magnet 23 has been installed on the pin 24, the inner end portion of the leg 47 engages the edges of the hole 46 to prevent rotation of the magnet. In addition, the tang 49 will engage the inner side of the operating arm 25 to captivate the magnet against removal from the pin in an axial direction (see FIG. 5c). The magnet can be removed from the pin only by applying a force to flex the bracket 45 reversely and it is extremely unlikely that such a force would ever be applied to the magnet during final manufacture, shipment and assembly of the brake 10. Accordingly, the present bracket 45 captivates the magnet and the spring 40 on the pin to facilitate handling of the brake 10 until such time as the brake and the drum 11 are assembled. The armature 14 then presses the magnet inwardly along the pin 24 while the leg 47 moves inwardly within the hole 46 and the tang 49 moves inwardly away from the operating arm 25 (see FIG. 3). The tank 49 does not, therefore, interfere with axial or pivotal floating of the magnet.

Figure 4:
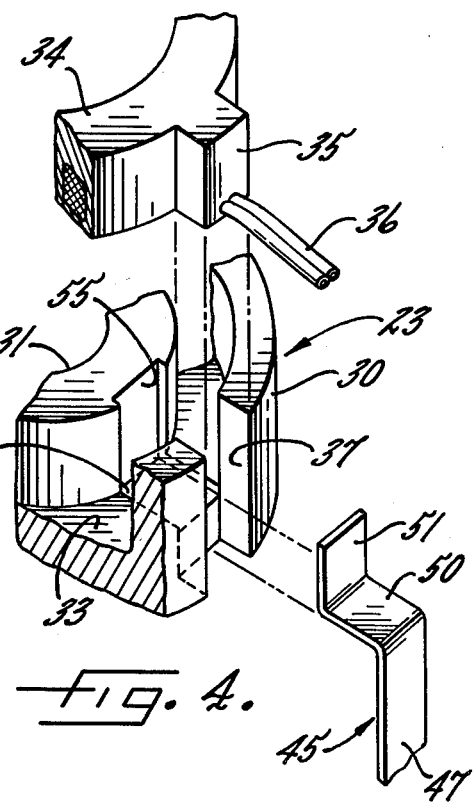
FIG. 4 is an exploded perspective view of the magnet and the bracket.
Figure 3:
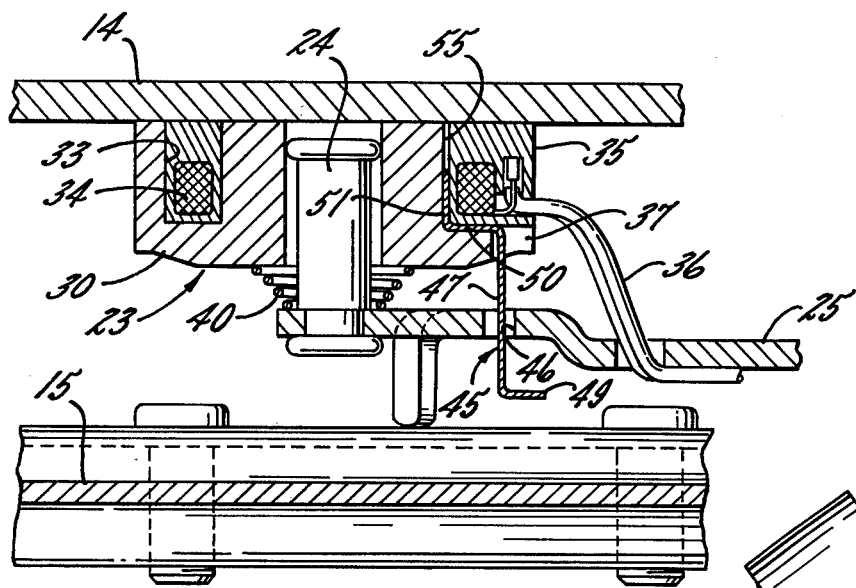

The present invention also contemplates a very simple and inexpensive arrangement for securing the bracket 45 to the magnet 23. As shown in FIGS. 3 and 4, a relatively short leg 50 is formed integrally with and extends substantially perpendicular to the outer end of the leg 47. In addition, a tab 51 is formed integrally with and extends substantially perpendicular to the leg 50 but in a direction opposite the leg 47.

In assembling the bracket 45 to the magnet 23, the upper end portion of the bracket is simply moved radially through the slot 37 in the shell 30 and is positioned as shown in FIG. 3 prior to installation of the coil assembly 34. The tab 51 thus lies against the innermost radially facing side of the groove 33, the leg 50 lies against the axially facing side of the groove, and the upper end portion of the leg 47 extends out of the slot 37. The coil assembly 34 then is telescoped into the groove and is bonded in place. In the assembled magnet, the tab 51 is sandwiched between the innermost radially facing side of the groove 33 and the opposing side of the coil assembly (see FIG. 3) so as to prevent radial separation of the bracket and the magnet. In addition, the leg 50 is sandwiched between the axially facing side of the groove 33 and the opposing side of the coil assembly and thus prevents axial separation of the bracket and the magnet. Finally, the upper end portion of the leg 47 is engageable with the edges of the slot 37 to prevent rotation of the bracket relative to the magnet. Accordingly, the bracket is held securely on the magnet and yet may be installed with a simple slip-in action prior to placing the coil assembly 34 within and bonding the coil assembly to the shell 30. Moreover, the slot 37 for receiving the tongue 35 of the coil assembly is used to advantage to also accommodate the bracket 45 and thus it is not necessary to form an additional bracket-receiving slot in the periphery of the shell 30.

Preferably, a notch 55 (FIG. 4) is formed in the innermost radially facing wall of the groove 33 while a second notch 56 is formed in the axially facing wall of the groove, the two notches having flat bottoms and being approximately of the same width and depth as the width and thickness, respectively, of the metal strip from which the bracket 45 is made. The notches 55 and 56 receive the tab 51 and the leg 50, respectively, and allow the coil assembly 34 to seat flush against the walls of the groove 33 in spite of the presence of the tab and the leg and without need of notching the inner circumferential surface of the coil assembly to the detriment of the magnetic characteristics of the assembly. The notches also help resist relative rotation between the bracket 45 and the magnet 23 and facilitate proper location of the bracket when the latter is slipped into the shell 30 during assembly.

From the foregoing, it will be apparent that the present invention brings to the art an electrically controlled brake 10 having a novel anti-rotation bracket 45 which can be quickly and easily assembled with the magnet 23 and the operating arm 25 and which serves to captivate the magnet axially on the mounting pin 24. Accordingly, the bracket facilitates better handling of the brake and yet may be manufactured and assembled at relatively low cost.

We claim:

1. An electrically controlled brake comprising a support having two sides and having a hole extending therethrough, a pin projecting from one side of said support, and an electromagnet telescoped with said pin, the improvement in said brake comprising a bracket for restricting rotation of said magnet on said pin and for permitting limited axial floating of the magnet on the pin while restricting axial removal of the magnet from the pin, said bracket comprising a strip of resiliently yieldable material having a leg extending generally parallel to said pin and secured at one end portion to said magnet to float axially with said magnet, said leg having an opposite end portion projecting slidably through said hole to restrict rotation of said magnet on said pin, and a tang integral with and extending substantially perpendicular to said opposite end portion of said leg and engageable with the other side of said support to restrict axial removal of said magnet from said pin.

2. An electrically controlled brake as defined in claim 1 in which said electromagnet comprises a shell having two faces and having an annular groove opening out of one of its faces, said electromagnet further comprising an annular coil assembly telescoped into said groove, said coil assembly and said groove having axially facing surfaces disposed in opposing relation to one another, a slot opening out of the other face of said shell and communicating with said groove, said one end portion of said leg being located within said slot, and a second leg integral with and disposed substantially perpendicular to said one end portion of said one leg and sandwiched between said opposing surfaces of said groove and said coil assembly to restrict axial separation of said magnet and said bracket.

3. An electrically controlled brake as defined in claim 2 in which said groove includes an innermost radially facing side, said brake further including a tab integral with and disposed substantially perpendicular to said second leg and sandwiched between said coil assembly and the innermost radially facing side of said groove to restrict radial separation of said magnet and said bracket.

4. An electrically controlled brake comprising a support having two sides and having a hole extending therethrough, a pin projecting from one side of said support, an electromagnet telescoped with said pin, said electromagnet comprising a shell having two faces and having an annular groove opening out of one of its faces, said groove having an axially facing side and an innermost radially facing side, said electromagnet further comprising an annular coil assembly telescoped into said groove, a slot opening out of the other face of said shell and communicating with said groove, a bracket having one end portion secured to said magnet and having an opposite end portion projecting into said hole to restrict rotation of said magnet on said pin, said one end portion of said bracket comprising a first leg located within said slot and extending generally parallel to said pin, and a second leg integral with and extending substantially perpendicular to said one leg and sandwiched between said coil assembly and said axially facing side of said groove to restrict axial separation of said magnet and said bracket.

5. An electrically controlled brake as defined in claim 4 further including a tab integral with and disposed substantially perpendicular to said second leg and sandwiched between said coil assembly and said innermost radially facing side of said groove to restrict radial separation of said magnet and said bracket.

6. An electrically controlled brake as defined in claim 5 further including notches formed in said axially facing side and in said innermost radially facing side of said groove and receiving said second leg and said tab, respectively.

7. An electrically controlled brake as defined in claim 6 in which said coil assembly includes a radially projecting tongue which is received within the same said slot as said first leg.

8. An electrically controlled brake as defined in claim 7 in which said bracket is formed of a strip of resiliently yieldable material, and a tang on said opposite end portion of said bracket and engageable with the other side of said support to restrict axial removal of said magnet from said pin.

* * * * *